March 10, 1970  D. E. GOMMEL  3,499,425
INTERNAL COMBUSTION ENGINE
Filed June 4, 1968  5 Sheets-Sheet 1

INVENTOR
DEWEY E. GOMMEL
BY
Hood, Gust, Irish & Lundy
ATTORNEYS

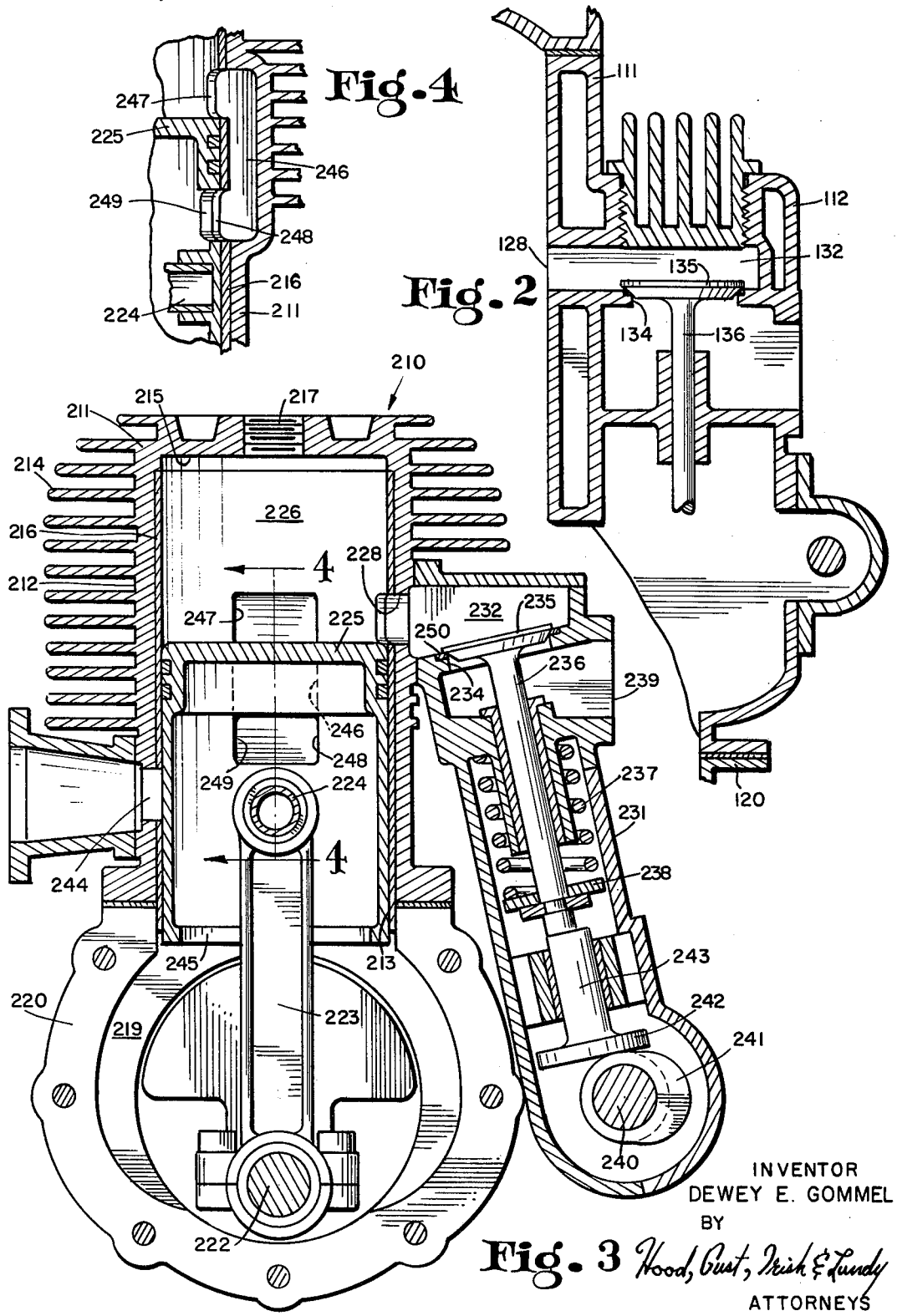

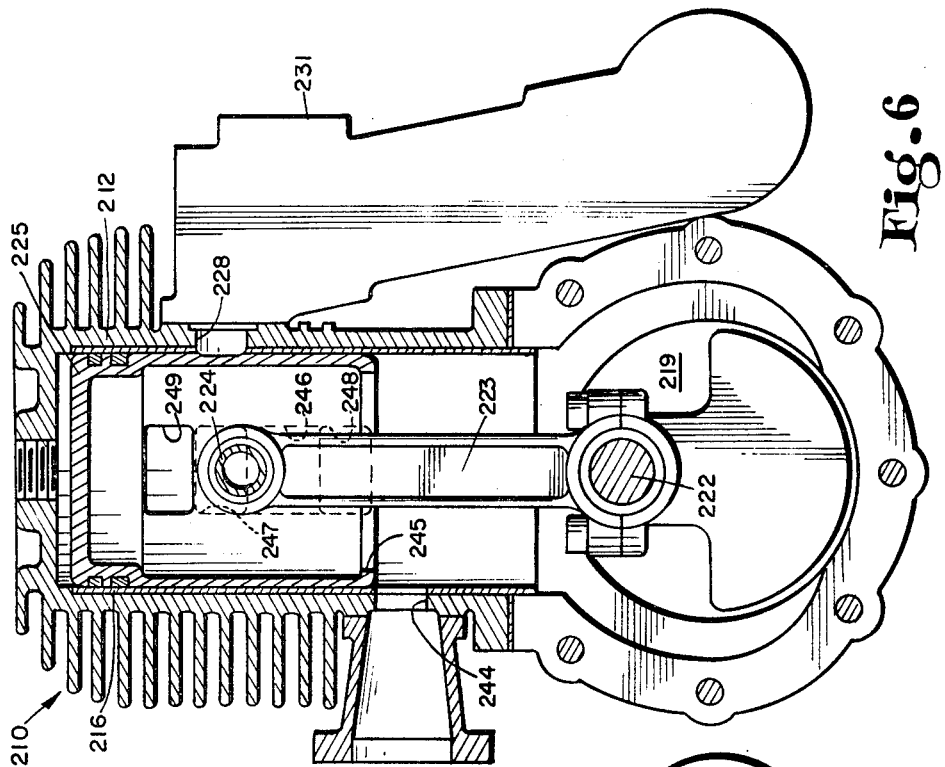
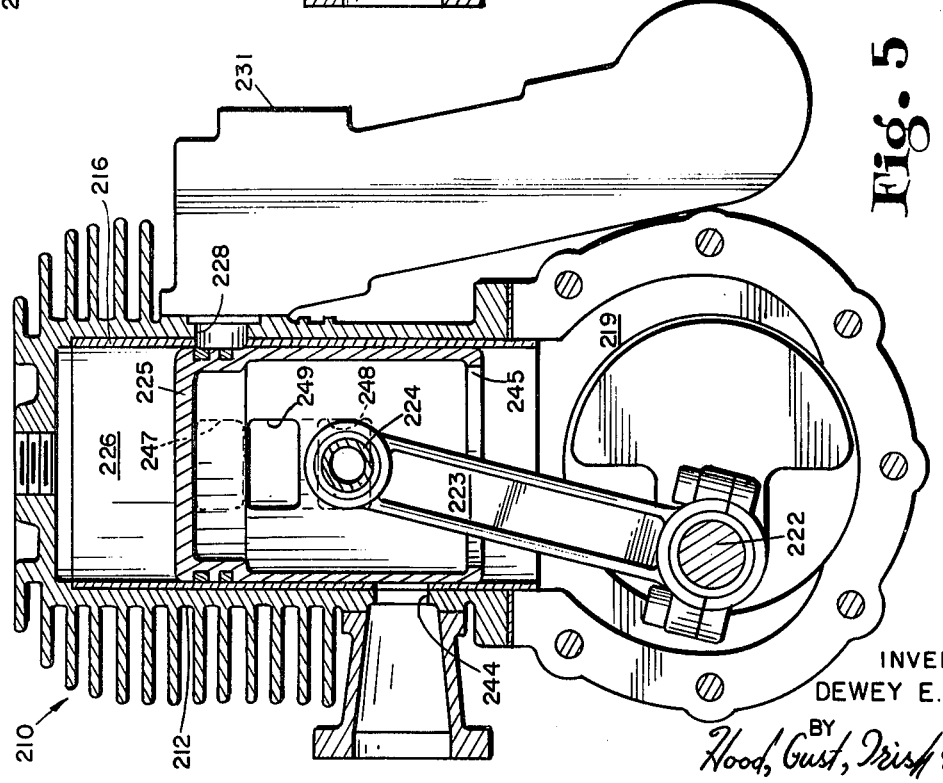

INVENTOR
DEWEY E. GOMMEL
BY
Hood, Gust, Irish & Lundy
ATTORNEYS

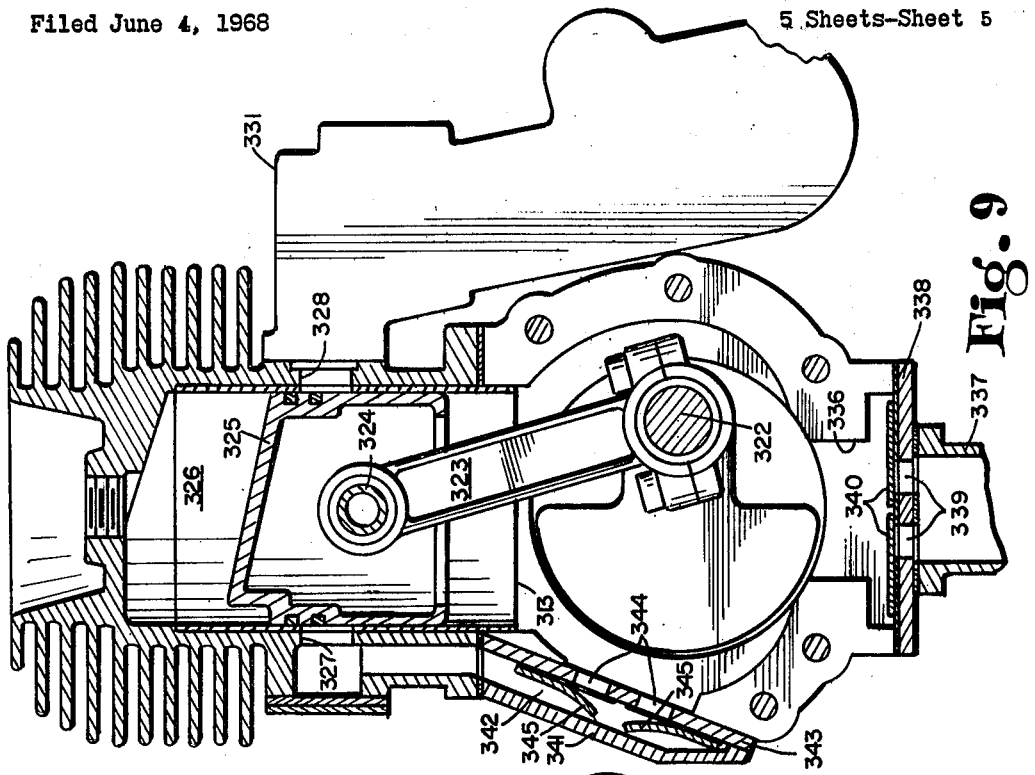
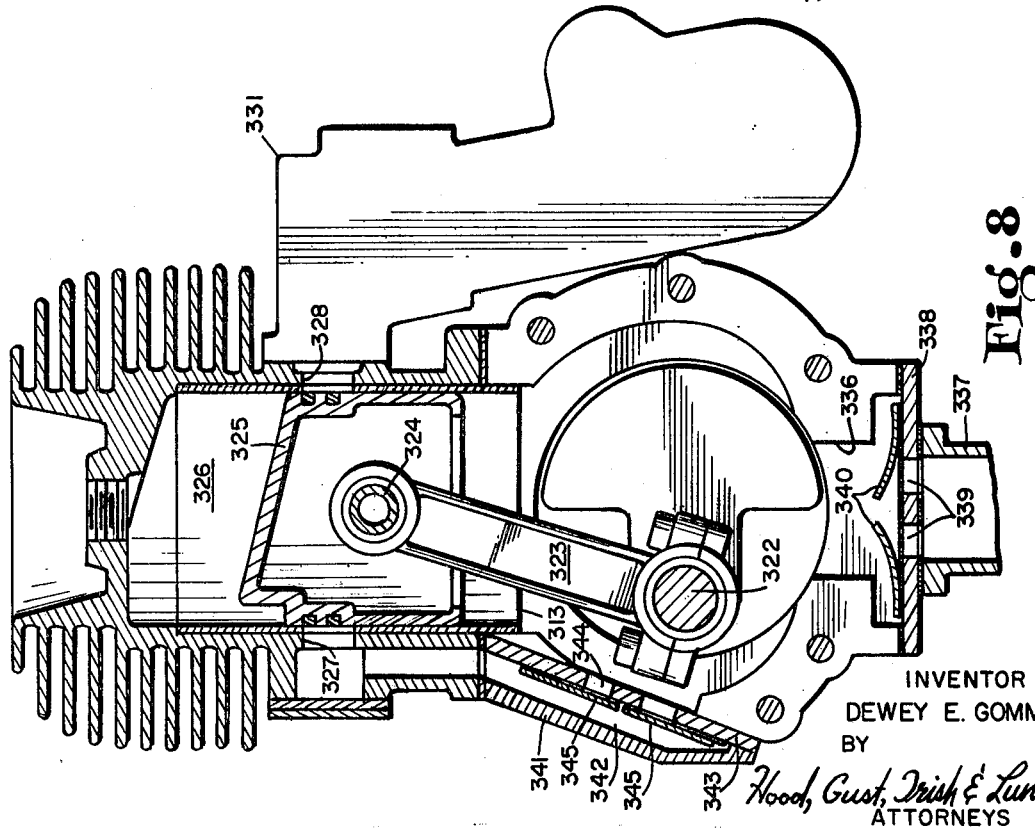

United States Patent Office 3,499,425
Patented Mar. 10, 1970

3,499,425
INTERNAL COMBUSTION ENGINE
Dewey E. Gommel, Box 4627, Greenville, Miss. 38701
Filed June 4, 1968, Ser. No. 734,333
Int. Cl. F02b 75/02, 33/04; F02d 39/02
U.S. Cl. 123—75                              21 Claims

ABSTRACT OF THE DISCLOSURE

A reciprocating-piston type of internal combustion engine in which many of the desirable characteristics of a 2-cycle engine are combined with many of the desirable characteristics of a 4-cycle engine, while undesirable characteristics of both kinds of engines are eliminated. In at least one form, the fuel is supplied directly to a variable-volume combustion chamber which is devoid of valves, and exhaust from the combustion chamber is through an auxiliary chamber, normally closed from the combustion chamber during fuel combustion, and through a valve remotely located in the auxiliary chamber and open for gas flow therethrough only after completion of the piston power stroke and before initiation of the first of two piston compression strokes. In another form, fuel is supplied to the combustion chamber through the engine crank case and the passageway between the crank case and the combustion chamber is closed at all times except when the fluid pressure in the crank case exceeds the fluid pressure in said passageway, whereby backflow of fluid from the passageway to the crank case is prevented. In still another form, valve means is provided at the point of introduction of fuel to the crank case to prevent fluid flow from the crank case toward the source of fuel supply.

---

The primary object of the present invention is to provide an improved internal combustion engine of the reciprocating piston type, embodying many of the desirable characteristics of 2-cycle engines and of 4-cycle engines while eliminating undesirable characteristics of both types. To that end, each cylinder of the improved engine is provided with wall ports for inlet and exhaust, said ports being so disposed as to be opened and closed by the reciprocating piston, so that the variable-volume combustion chamber within the cylinder is wholly devoid of valves.

A further object of the invention is to provide, in such an engine, an exhaust valve, driven from the engine crank shaft to open only once in two revolutions of the crank shaft, and disposed in an auxiliary chamber which is closed from the combustion chamber during actual combustion so that said valve is not subjected to the intense pressures and radical temperatures which arise within the combustion chamber itself.

Still another object of the invention is to provide, in an engine of the character above described and in which fuel is supplied to the combustion chamber through the crank case, a passageway leading from the crank case to the cylinder inlet port, with valve means disposed at the point of communication between the crank case and said passageway and automatically operable to prevent backflow from said passageway to said crank case.

A further object of the invention is to provide, in such an engine, valve means between the fuel supply line and the crank case to prevent backflow when the crank case pressure is superatmospheric.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, or in the specific steps stated, so long as the scope of the appended claims is not violated.

FIG. 2 is a fragmentary section, drawn to an enlarged scale, showing a modified arrangement of auxiliary chamber and exhaust valve;

FIG. 3 is a similar section through a different form of engine in which fuel is supplied to the combustion chamber through the crank case and through a passageway providing, at times, communication between the crank case and the combustion chamber;

FIG. 4 is a fragmentary section taken substantially on the line 4—4 of FIG. 3 and further illustrating the above-mentioned passageway;

FIG. 5 is a section similar to FIG. 3, drawn to a reduced scale and illustrating the piston in an intermediate position during upward travel;

FIG. 6 is a similar section showing the piston at the upper limit of its stroke;

FIG. 8 is a section through the engine of FIG. 7, drawn to a reduced scale, and showing the parts in the positions assumed during upward travel of the piston; and FIG. 9 is a view similar to FIG. 8 but showing the piston in an intermediate position during downward travel.

Figure 1:
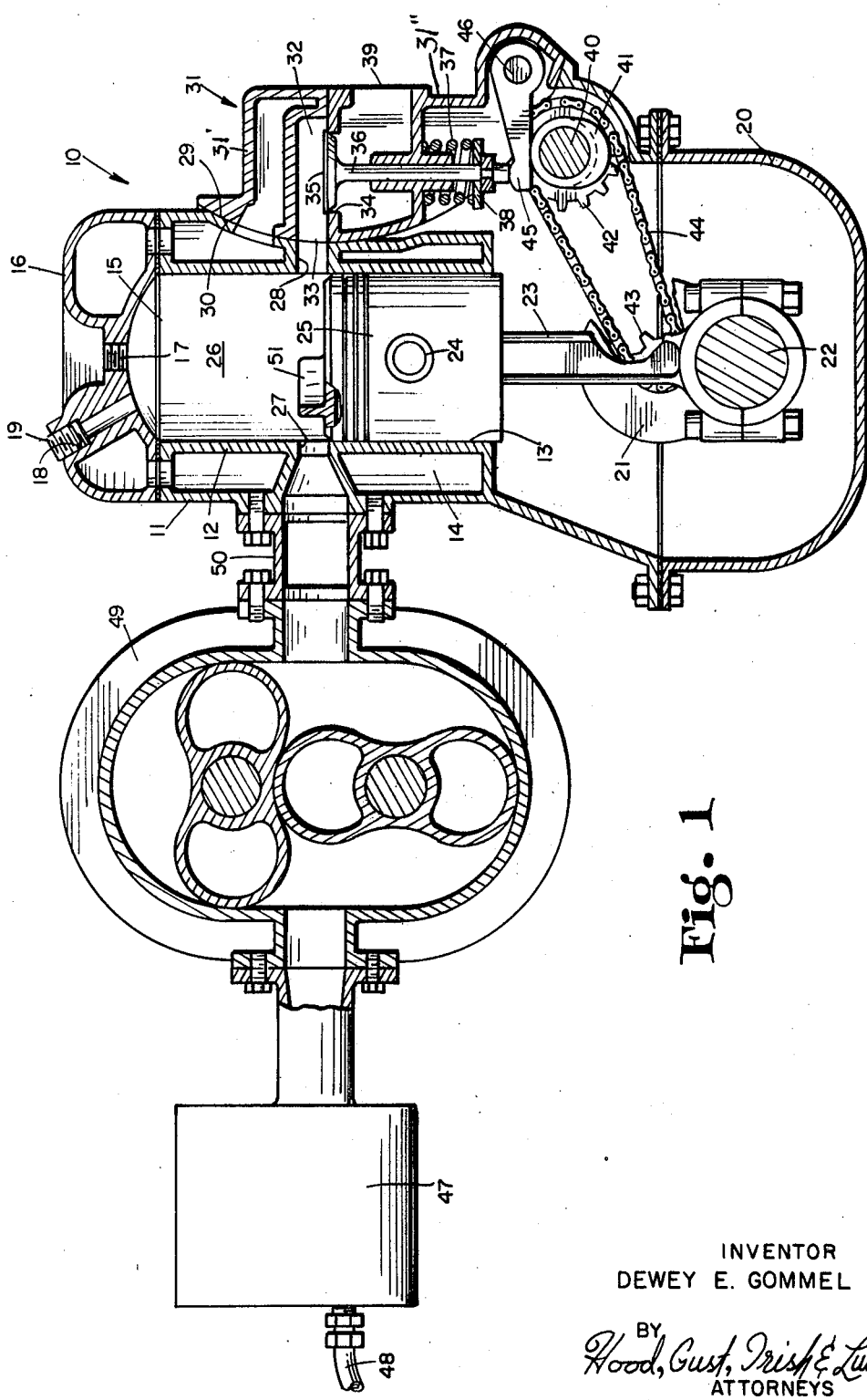
FIG. 1 is a somewhat diagrammatic vertical section through an engine constructed in accordance with the present invention and adapted to be supplied with a combustible fuel mixture directly through a cylinder wall port, blower means being illustrated between a carburetor or the like and the cylinder inlet port.

Referring more particularly to FIG. 1, it will be seen that I have illustrated an engine of the internal combustion, reciprocating-piston type, indicated generally by the reference numeral 10, and comprising a cylinder block 11 formed to define a cylinder 12 which is open at its lower end 13. In FIG. 1, I have shown the block 11 formed to provide a conventional water jacket 14; but it will be understood that all of the engine forms illustrated may be either water cooled or air cooled. In the form of engine illustrated in FIG. 1, the upper end 15 of the cylinder 12 is also open and is adapted to be closed by a head 16 which may be suitably formed and ported to provide a continuation of the water jacket 14. As shown, the head 16 is provided with a threaded port 17 for the reception of a sparkplug. I have shown, also, a further threaded port 18 in the head 16 which, in the illustration, is closed by a threaded plug 19. It is to be understood that, while I have shown a carburetor and a blower associated with the cylinder 12, for supplying fuel to be ignited by a sparkplug, I could alternatively arrange a fuel injector in the port 18, and eliminate the carburetor, while still supplying air to the cylinder by means of a blower such as, for instance, that shown at 49. Further, if the engine is designed with an appropriately smaller combustion chamber to produce an adequate degree of compression of the combustile mixture in the cylinder, the sparkplug may be eliminated and the engine will operate on the diesel principle. Obviously this injector expendient may be used in any of the engines described in the present specification.

A crank case casing or pan 20 is adapted to be suitably secured to the depending skirt of the block 11 to house a crank shaft 21 formed with a crank 22 to which is secured the lower end of a piston rod 23 the upper end of which is connected by a wrist pin 24 to a piston 25 mounted for reciprocation in the cylinder 12 to define therewith a variable-volume combustion chamber 26.

An inlet port 27 and an exhaust port 28 are formed, at peripherally spaced points, in the wall of the cylinder 12, preferably at a common level just above the lowermost position of the head of the piston 25. It will be clear that, as the piston begins to rise from its illustrated position, it will close the ports 27 and 28 and that those ports will remain closed from the time when the piston head passes the upper edges of those ports until the time when, as the piston descends, its head begins to clear the upper edges of those ports. Specifically, the ports 27 and 28 are closed during the major portion of each resolution of the crank shaft and are opened during 35° to 60° of the movement of the crank 22 on each side of the nadir position illustrated in FIG. 1.

In the region of the outer end of the port 28, the block 11 is formed with a concave face 29 for mating with a correspondingly shaped face 30 of a separable housing illustrating generally by the reference numeral 31, and preferably comprising an upper casting 31' and a lower casting 31''. Said housing is formed to provide an auxiliary chamber 32 having a port 33 always in open registry with the port 28. At a point remote from the port 33, said chamber is formed to provide a further port 34 dominated by a valve which, in the illustrated embodiment of the invention, is shown as a poppet valve 35 having a stem 36 suitably guided in the casting 31'' and resiliently urged into closing relation with the port 34 by a spring 37 confined between a face of the casting 31'' and a seat 38 stationarily mounted on the stem 36. The interior of the casting 31'' opens to atmosphere or to an exhaust manifold at 39.

Suitably journalled near the valve stem 36 is a cam shaft 40 carrying a cam 41. A sprocket 52 fixed to the cam shaft 40 is driven, from a sprocket 43 fixed to the crank shaft 21, by a chain 44, the sprockets being so proportioned that the cam shaft 40 will be turned through one revolution by each two revolutions of the crank shaft 21. A rocker arm 45, mounted on a rock shaft 46 journalled in the casting 31'', rides the surface of the cam 41 and bears upon the lower end of the valve stem 36. Thus, once during each second revolution of the crank shaft 21, the valve 35 will be moved off its seat 34 to open the chamber 32 to atmosphere or to be an exhaust manifold.

Somewhat diagrammatically, I have suggested at 47 means such as a carburetor for producing a combustible mixture of fuel and air. A fuel supply line 48 leads from a suitable fuel source to the means 47, and a blower 49 is connected between the means 47 and a fitting 50 communicating with the cylinder port 27.

In operation, when the piston 25 is substantially at the top of its stroke, with the ports 27 and 28 closed and the valve 35 closed, the compressed combustible mixture in the combustion chamber 26 will be ignited to drive the piston downwardly. Before the piston head reaches the upper edges of the ports 27 and 28, the cam 41 will rock the arm 45 to lift the valve 35, against the tendency of its spring 37, off the seat 34, thus opening the auxiliary chamber 32 to exhaust. The travel of the piston 25 from its uppermost position to the position at which it begins to open the port 28 constitutes, of course, the power stroke of the piston. The moment the piston begins to open the port 28, the hot, expanding gases can begin to escape through said port and the port 34 so that further movement of the piston downwardly to its position illustrated in FIG. 1 is not actually a portion of the power stroke. Thus, because the piston stroke is longer than the power stroke, and the crank lever arm is a direct function of piston stroke, the power applied to my crank during the power stroke of my piston produces a greater torque than it would if it were applied to a crank proportioned to a piston having a total stroke equal only to my power stroke.

The power displacement of this internal combustion engine is figured by multiplying the piston area by the power stroke length times the number of cylinders.

The compression ratio of these engines is figured in relation to the power stroke and not the piston stroke.

It will be apparent that, as the piston begins to open the port 28, it will begin correspondingly to open the port 27, whereby fuel mixture, being impelled by the blower 49, will begin to rush into the chamber 26 to assist in scavenging the products of combustion through the port 28 and the port 34. Preferably, the piston head will be provided with an upstanding baffle 51 facing the port 27 and tending to divert the in-rushing fuel mixture upwardly in the chamber 26 to clear burned gases from the upper portion of said chamber.

Depending upon the contour of the cam 41, the valve 35 will close onto its seat 34 just after the piston head in its upward movement closes the ports 27 and 28. Continued upward movement of the piston 25, of course, compresses the fuel mixture in the chamber 26. After the piston reaches its uppermost position, it will begin immediately to decend once more, thus rarefying the gaseous mixture in the chamber 26; and when the port 27 is again cleared by the piston, further fuel mixture will enter the chamber 26 under the influence of the blower 49. This time, of course, no gases will escape from the chamber 26 through the port 28, since the valve 35 is closed, with the cam 41 in its illustrated position. Thus, it may be said that the cylinder is supercharged during this portion of the engine's cycle. Now, as the piston again ascends, the fuel charge is highly compressed in advance of ignition.

It will be noted that the only movable valve in the engine is the valve 35 which is so disposed in the auxiliary chamber 32 that said valve is never exposed to the extreme pressure and temperature conditions which exist in the combustion chamber 26 during the power stroke of the piston. By the time the piston completes its power stroke and begins to open the port 28, actual burning of the fuel has been completed and maximum pressure within the chamber 26 has been reduced by enlargement of that chamber. At this time, the valve 35 is in open position so that pressures on its opposite sides are substantially equal. Furthermore, the valve 35 is relatively remote from the combustion chamber so that both temperature and pressure conditions to which it is directly subjected are relatively mild.

While I presently believe that the arrangement of the auxiliary chamber 32, the valve 35 and its operating mechanism in a separable housing as illustrated at 31 in FIG. 1 is optimum, it will be apparent that, alternatively, the arrangement of FIG. 2 may be adopted. As there shown, the cylinder block 111 is formed to provide an integral, lateral protuberance 112 with which the crank case casting or pan 120 may mate, and formed to provide an auxiliary chamber 132 constituting, in effect, a continuation of the cylinder exhaust port 128. A port 134 opens from the auxiliary chamber 132 and is dominated by a valve 135 having a stem 136 suitably guided within the protuberance and resiliently urged into engagement with the seat 134 by means equivalent to the spring 37 of FIG. 1. The valve 135 will be operated in precisely the manner of operation of the valve 35 as described above.

In FIGS. 3 to 6, I have shown a modified form of engine in which, generally in accordance with conventional practice in 2-cycle engines, a combustible fuel mixture is supplied to the combustion chamber through the engine crank case.

This form of engine, indicated generally by the reference numeral 210, comprises a cylinder block 211 formed to provide a cylinder 212 which is open at its lower end 213. In this case, I have chosen to illustrate an air cooled engine, the block 211 being formed with radiating fins 214; but it will be understood that this form of engine might be water cooled, in which case the block would be formed to provide a jacket similar to the jacket 14 of FIG. 1.

Also, in this case I have chosen to illustrate a cylinder block in which the uper end 215 of the cylinder is closed by an integral head; but again, it will be obvious that a separable head might be used with the block 211.

In FIG. 3, I have shown a cylinder line 216 which may be made of iron or steel in case it is desired to make the block from aluminum or the like; and of course it will be understood that a similar expedient may be used in the form of engine illustrated in FIGS. 1 and 2. A threaded port 217 is provided for the reception of a sparkplug.

The lower, open end 213 of the cylinder 212 is in open communication with the crank case chamber 219 provided by the crank case casting 220. A crank shaft (not shown in detail) is journalled in the crank case 220 and is formed with a crank 222 to which is connected the lower end of a piston rod 223 connected at its upper end, by a wrist pin 224, with a piston 225 reciprocably received in the liner 216 to define, with the upper end of the cylinder, a variable-volume combustion chamber 226.

At a point just above the lowermost position of the head of the piston 225, an exhaust port 228 opens through the cylinder wall; and a separable housing 231, formed to provide an auxiliary chamber 232, is secured to the block 211 with said auxiliary chamber 232 always in open communication with the port 228. A port 234, dominated by a valve 235, opens from the chamber 232 to atmosphere or to an exhaust manifold, as at 239. The valve 235 is provided with a stem 236 suitable guided in the housing 231 and a spring 237 bearing upon a seat 238 fixed relative to the stem 236 resiliently urges the valve 235 into sealing relation with the port 234. A cam shaft 240 is journalled in the housing 231 and carries a cam 241 arranged to cooperate with the head 242 of a separately guided push pin 243 against which the valve stem 236 is urged by the spring 237. The cam shaft 240 will be driven by suitable means (not shown) to make one revolution for each two revolutions of the crank shaft. Thus, the valve 235 will be operated in the same mode described in connection with the valve 35. If desired, a separate, alloy seating ring 250 may be provided for the valve 235, particularly if the housing 231 is formed from aluminum or the like.

At a point near the lower, open end 213 of the cylinder 212, a fuel inlet port 244 opens through the cylinder wall. Of course, the port 244 will be connected to means for producing a combustible mixture of fuel and air. It will be apparent that, when the piston 225 is at its uppermost position, as illustrated in FIG. 6, the port 244 will be open to the crank case chamber 219 but that, throughout the major portion of each cycle of the piston, the piston skirt will close said port 244.

As is clearly illustrated, the piston 225 is hollow and its lower end 245 is open to the crank case chamber 219. The cylinder block 211 is formed to provide a passageway 246 having an upper end port 247 opening into the combustion chamber 226 at a level just above the lowermost position of the head of the piston 225 and having a lower end port 248 opening through the cylinder wall at a level just above the port 244, said passageway and its ports being peripherally spaced from the port 244 and from the port 228. The piston skirt is formed with a port 249 so positioned that, when the piston is in its lowermost position, as illustrated in FIG. 3, said port 249 registers wtih the port 148, thereby providing open communication between the combustion chamber 226 and the crank case chamber 219.

In operation, the compressed fuel mixture in the chamber 226 will be ignited when the parts are substantially in the positions illustrated in FIG. 6. In this condition, the port 244 will be open, but the cylinder skirt will be in closing relation to the ports 247 and 248, and the piston port 249 will be closed by reason of the fact that it is in registry with a solid portion of the liner 216. As the piston is forced downwardly by the expansion of the burning gases, the port 244 will be promptly closed, whereby further downward movement of the piston will tend to compress the gases present in the crank case chamber 219. As the port 244 is closed, the piston port 249 will move into registry with the passageway port 247; but, since the passageway port 248 is still closed by the piston skirt, this will have no effect except to put the interior of the passageway 246 into communication with the crank case chamber 219. As the piston continues to move downwardly, its head will begin to clear the ports 228 and 247, while its port 249 begins to move into registry with the passageway port 248. Meantime, and before the piston begins to clear the port 228, the cam 241 will have lifted the valve 235 off its seat. Thus, the true power stroke of the piston 225 ends as the piston begins to clear the port 228 to permit the products of combustion within the chamber 226 to escape. At the same time, compressed gases from the crank case chamber 219 begin to rush through the port 249, the port 248, the passageway 246 and the port 247, into the combustion chamber 226 to assist in scavenging the products of combustion therefrom. By the time the piston has reached the bottom of its stroke, as in FIG. 3, the products of combustion will have been effectively cleared from the combustion chamber and a charge of fuel mixture will have entered that chamber.

Now, as the piston starts to move upwardly, it will tend further to drive exhaust gases from the chamber 226 through the port 228, the valve 235 still being open, until the piston closes the ports 228 and 247, whereafter further upward movement of the piston will tend to compress the initial fuel charge in the combustion chamber. Meantime, as the piston moves upwardly beyond the position of FIG. 5, it tends to create a vacuum within the crank case chamber 219. Movement of the port 249 into and past registry with the port 247 will have no substantial effect upon the pressure within the combustion chamber 226 or within the chamber 219, because the port 248 is closed.

When the lower end 245 of the piston skirt begins to clear the port 244, fuel mixture will rush through that port and into the crank case chamber 219, and this fuel flow will continue until the piston starts again to move downwardly.

As the piston moves downwardly, it will close the port 244, whereafter continued downward movement will compress the fuel mixture in the crank case chamber 219 until the port 249 begins to register with the port 248 while the head of the piston begins to clear the port 247. As the piston continues to its nadir position as illustrated in FIG. 3, the compressed fuel mixture in the crank case chamber 219 will be pumped through the passageway 246 to supercharge the combustion chamber 226. At this time, of course, the valve 235 is closed, so that the additional charge of fuel cannot escape to exhaust.

Now, as the piston again moves upwardly, the ports 228, 247 and 248 will be closed and the fuel mixture in the combustion chamber will be compressed for ignition when the parts are substantially in the position of FIG. 6. Of course, as the port 244 is cleared by the lower end 245 of the piston, fuel will again be drawn into the crank case chamber 219.

It will be seen that, as a result of this construction, the fuel inlet port 244 to the crank case chamber 219 is closed at all times when superatmospheric pressure prevails in the chamber 219, and the passageway 246 will be closed relative to the crank case chamber 219 at all times when the pressure in the combustion chamber 226 exceeds that in the crank case chamber 219.

Figure 7:
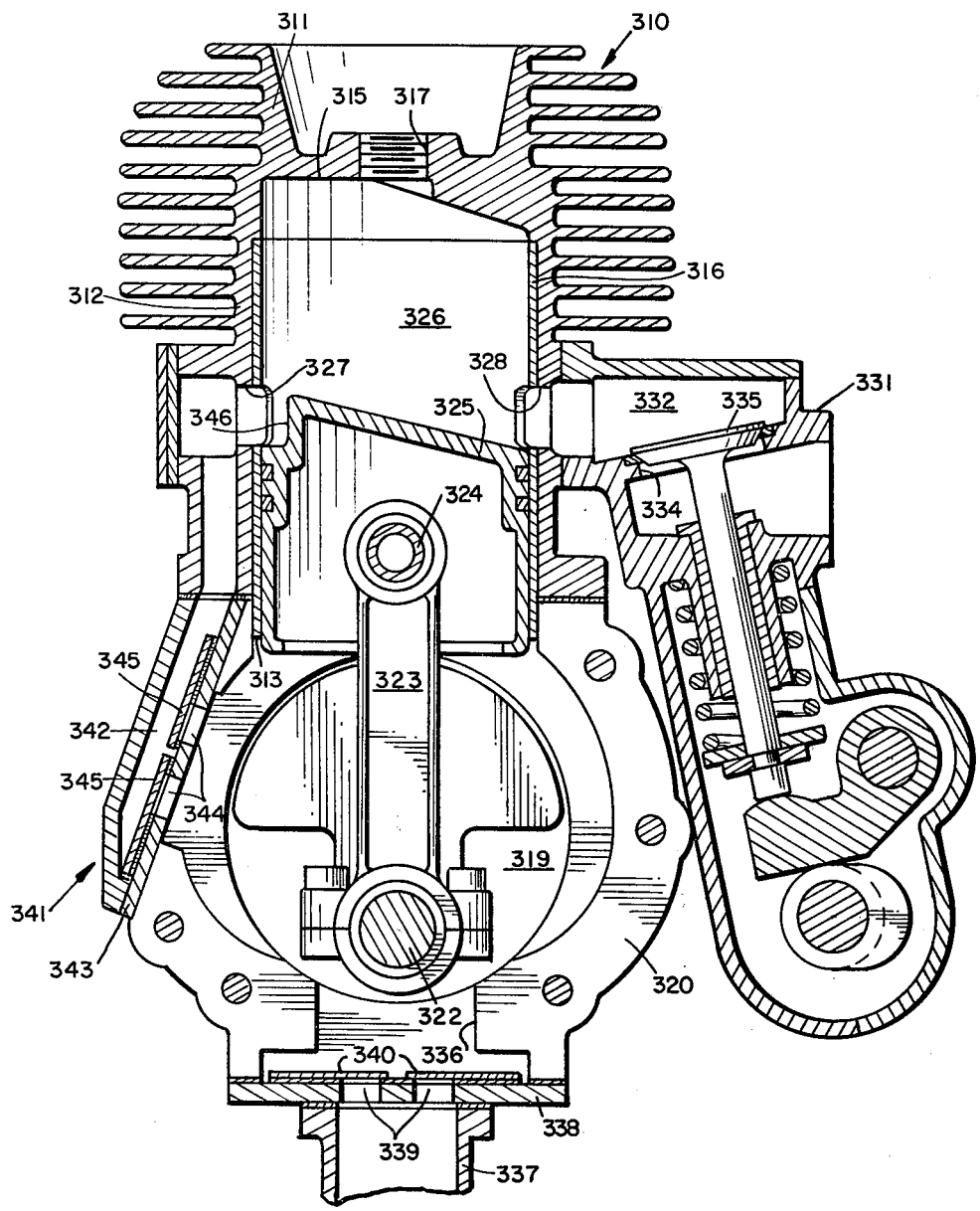
FIG. 7 is a vertical section through still another form of engine in which fuel is supplied to the combustion chamber through the crank case and thence through a passageway leading from the crank case to the cylinder inlet wall port.

In the form of invention illustrated in FIGS. 7 to 9, I have shown an air cooled engine indicated generally by the reference numeral 310 and comprising a cylinder block 311 formed to provide a cylinder 312 having an open end 313 and a closed end 315, the cylinder being provided with a liner 316 and a sparkplug port 317. A crank case chamber 319 within a crank case casting 320 is similar to the chamber 219 above described and houses a crank shaft formed with a crank 322 to which is connected one end of a piston rod 323, the other end of which is connected, as by a wrist pin 324, to a piston 325 reciprocably mounted in the cylinder to define, with the closed end thereof, a variable-volume combustion chamber 326. At a common level remote from the closed cylinder end 315, an inlet port 327 and an exhaust port 328 open through the cylinder walls at peripherally-spaced points, preferably diametrically opposite each other.

A separable housing 331, formed to provide an auxiliary chamber 332, is suitably secured to the block 311 with the chamber 332 always in open communication with the port 328. A port 334 opens from the chamber 332 and is dominated by a valve 335 similar in construction, mounting and operation to the valve 35 illustrated in FIG. 1.

The crank case 320 is formed with a fuel inlet port 336 to which is connected a fuel supply line 337 leading from any suitable means (not shown) for forming a combustible mixture of fuel and air. Valve means 338 is interposed between the line 337 and the port 336, said valve means comprising a plate formed with one or more ports 339 guarded by flexible reeds 340 which may be formed from any suitable, resiliently flexible sheet material which is relatively impervious to the fuel mixture to be used.

The reference numeral 341 generally indicates means providing a passageway 342 connecting the chamber 319 with the cylinder port 327. At the point of communication of the passageway 342 with the chamber 319, I provide valve means 343 which, as illustrated, comprises a plate formed with one or more ports 344 guarded by resiliently flexible reeds 345. It will be apparent that each of the valve means 338 and 343 comprises a one-way valve of such character as automatically to prevent reverse flow therepast.

In the operation of the engine 310, the compressed fuel in the combustion chamber 326 will be ignited when the piston 325 is substantially at the upper limit of its stroke. At this moment, the piston 325 has closed the ports 327 and 328 and the valves 335, 338 and 343 will be closed. As the piston moves downwardly, it will act to increase the pressure within the chamber 319, whereby the reeds 345 will be flexed, as shown in FIG. 9, and gases from the chamber 319 will be driven into, and compressed within, the passageway 342. The power stroke of the piston 325 will end as the piston head begins to clear the ports 327 and 328 and the products of combustion will escape through the port 328, the valve 335 having been moved to open position before the piston begins to clear the port 328. At the same time, the piston will begin to clear the port 327 and the combustible mixture which is under pressure in the passageway 342 will begin to rush through the port 327 into the combustion chamber. As shown, the piston 325 is preferably formed with a baffle surface 346 which tends to deflect the in-rushing fuel mixture upwardly in the combustion chamber to assist in scavenging the burned gases from the combustion chamber 326, through the port 328 and auxiliary chamber 332 and through the port 334 to exhaust. As the piston continues to the lower end of its stroke, as shown in FIG. 7, it will continue to pump fuel mixture from the chamber 319 past the valve means 343 into and through the passageway 342. When, however, the piston reaches the position of FIG. 7, the reeds 345 will close the ports 344.

Now, as the piston starts to move upwardly, it will continue to eject gases through the port 328 and at the same time it will tend to reduce the pressure in the chamber 319, whereby the reeds 340 will be flexed to admit fuel from the line 337 into the chamber 319. After the head of the piston passes the upper edges of the ports 327 and 328, continued upward movement of the piston, as suggested in FIG. 8, will compress the fuel charge in the combustion chamber 326 and will continue to draw fuel into the crank case chamber 319, while the reeds 345 remain in closing relation to the ports 344 to prevent backflow from the passageway 342 into the crank case chamber 319. The valve 335 closes just after the piston closes the port 328.

As the piston starts again downwardly from its uppermost position, the reeds 340 will promptly close, whereby further downward movement of the piston will begin to compress the combustible mixture in the chamber 319. As soon as the pressure within the chamber 319 exceeds the retained pressure in the passageway 342, the reeds 345 will again be flexed and further combustible mixture will be pumped from the chamber 319 into the passageway 342 so that, as the piston begins to clear the port 327, a further charge of fuel mixture will rush into the combustion chamber 326. Because the valve 335 is closed at this time, nothing can escape from the combustion chamber which will thus be supercharged. When the piston again begins to move upwardly, the reeds 345 will instantly close upon the ports 344 to retain pressure in the passageway 342 and the fuel charge in the combustion chamber 326 will be compressed as the piston moves on past the position of FIG. 8 to the upper limit of its stroke where, again, the compressed fuel mixture will be ignited. During this upward movement of the piston, of course, the reeds 340 will be flexed to draw a further charge of fuel into the chamber 319.

It will be seen that, in all of the engine forms disclosed herein, the combustion chamber is devoid of movable valves which might be subjected to the extreme pressure and temperature conditions which exist during combustion. In all forms illustrated, there is provided, however, an auxiliary exhaust valve, driven from the crank shaft, which is open only once during each two revolutions of the crank shaft in order to provide for 4-cycle operation of an engine in which the piston opens a cylinder exhaust port once in each revolution of the crank shaft. It will be appreciated that, in the absence of such auxiliary exhaust valve, engines otherwise conforming to the present disclosure could be operated as 2-cycle engines but would still retain significant advantages over previously-known 2-cycle engines.

In the forms of invention illustrated in FIGS. 3 to 9, I have provided means for preventing backflow of fuel mixture to the crank case, even while the cylinder fuel inlet port is open, thereby conserving the fuel charge to the combustion chamber and maintaining pressure in the passageway connecting the crank case with the combustion chamber. Additionally, in both forms of engine illustrated in FIGS. 3 to 9, I have provided maens for preventing backflow from the crank case toward the fuel source at all times when the pressure in the crank case exceeds that in the fuel line.

While only a single cylinder and its associated parts have been illustrated in the drawings of each type of engine disclosed herein, it will be understood, of course, that any such engine may comprise a plurality of cylinders with cooperating pistons working upon a common crank shaft. Any one of the separable housings 31, 231 and 331 may be formed to provide individual auxiliary chambers, each provided with its own valve, for cooperation with a plurality of cylinders; or, in a multi-cylinder engine, each cylinder may be provided with its own separable housing.

It will also be understood that, although I presently believe that the poppet valves illustrated in the accompanying drawings are optimum and that the reed valves illustrated in FIGS. 7 to 9 are optimum for use at their illustrated points, other types of valve means may be used in place thereof. Any form of one-way valve which will accomplish the functions of the valves 338 and 343 may be substituted therefor; and suitably-driven rotary valves, sleeve valves or the like may be substituted for the illus-

I claim as my invention:

1. A 4-cycle, internal combustion engine comprising a cylinder block formed to provide a cylinder open at one end and provided, at peripherally-spaced points remote from the other end of said cylinder, with an inlet port and an exhaust port in its side walls, a crank shaft arranged adjacent the other end of said cylinder, a piston reciprocably received in said cylinder and defining therewithin a variable-volume combustion chamber, said combustion chamber being wholly devoid of valves, means extending through the open end of said cylinder and connecting said piston to drive said crank shaft, said piston being movable past said ports to close the same during the major portion of each revolution of said crank shaft and to open said ports to said combustion chamber during at least 70° of each revolution of said crank shaft, said engine including means defining an auxiliary chamber in open communication with said cylinder exhaust port, said auxiliary chamber being provided with a port at a point remote from the point of communication of said auxiliary chamber with said cylinder exhaust port, valve means dominating said auxiliary chamber port, and means driven from said crank shaft for opening said valve means only on alternate occasions when said cylinder exhaust port is open.

2. The engine of claim 1 in which said auxiliary chamber is laterally offset from the path of said piston and is defined by an integral portion of said cylinder block.

3. The engine of claim 1 in which the means defining said auxiliary chamber is a separable housing secured to said cylinder block.

4. The engine of claim 3 in which said separable housing encloses also said valve means and at least a portion of said means driven from said crank shaft.

5. The engine of claim 1 in which said inlet portion and said exhaust port are disposed at a common distance from said other end of said cylinder which is less than the maximum distance of withdrawal of the head of said piston from said other end of said cylinder, whereby the power stroke of said piston terminates before said piston reaches such maximum distance of withdrawal, and in which said valve means is closed at all times except near the termination of said piston power stroke.

6. The engine of claim 5 in which said piston is provided with baffle means projecting toward said other end of said cylinder, spaced radially inwardly from the external periphery of said piston and substantially registering with said cylinder inlet port at all times when said cylinder inlet port is open.

7. The engine of claim 1 including means for producing a combustible mixture of fuel and air, and blower means connected between said mixture-producing means and said cylinder inlet port to deliver such mixture to said combustion chamber whenever said cylinder inlet port is open.

8. The engine of claim 3 including means for producing a combustible mixture of fuel and air, and blower means connected between said mixture-producing means and said cylinder inlet port to deliver such mixture to said combustion chamber whenever said cylinder inlet port is open.

9. The engine of claim 1 including a fuel source, injector means connected near said other end of said cylinder for delivering fuel at predetermined intervals to said combustion chamber, and blower means connected to said cylinder inlet port to deliver air to said combustion chamber whenever said cylinder inlet port is open.

10. The engine of claim 1 including a crank case housing said crank shaft and means providing a passageway between said crank case and said cylinder inlet port, means for producing a combustible mixture of fuel and air, conduit means connecting said mixture-producing means to deliver such mixture to said crank case, and valve means dominating said conduit means.

11. The engine of claim 1 including a crank case housing said crank shaft and means providing a passageway between said crank case and said cylinder inlet port, means for producing a combustible mixture of fuel and air, conduit means connecting said mixture-producing means to deliver such mixture to said crank case, and valve means dominating said passageway.

12. The engine of claim 1 including a crank case housing said crank shaft and means providing a passageway between said crank case and said cylinder inlet port, means for producing a combustible mixture of fuel and air, conduit means connecting said mixture-producing means to deliver such mixture to said crank case, valve means dominating said conduit means and valve means dominating said passageway.

13. The engine of claim 1 including a crank case housing said crank shaft and means providing a passageway between said crank case and said cylinder inlet port, means for producing a combustible mixture of fuel and air, conduit means connecting said mixture-producing means to deliver such mixture to said crank case, and a reed valve dominating said conduit means and opening toward said crank case.

14. The engine of claim 1 including a crank case housing said crank shaft and means providing a passageway between said crank case and said cylinder inlet port, means for producing a combustible mixture of fuel and air, conduit means connecting said mixture-producing means to deliver such mixture to said crank case, and a reed valve dominating flow between said crank case and said passageway and opening toward said passageway.

15. The engine of claim 13 including a reed valve dominating flow between said crank case and said passageway and opening toward said passageway.

16. The engine of claim 10 in which said conduit means includes a further port through said cylinder wall at a point more remote from said other end of said cylinder than the maximum distance of withdrawal of said piston therefrom, and in which said valve means dominating said conduit means comprises a portion of said piston which overlies and closes said further port at all times except when said piston is substantially at its point of minimum distance from said other end of said cylinder.

17. The engine of claim 1 in which said exhaust port is spaced from said other end of said cylinder by a distance which is less than the maximum distance of withdrawal of the head of said piston from said other end of said cylinder, whereby the power stroke of said piston terminates as said piston head begins to clear said exhaust port and significantly before said piston reaches such maximum point of withdrawal.

18. The engine of claim 1 including a crankcase housing said crankshaft and means providing a passageway between said crankcase and said cylinder inlet port, means for delivering air to said crankcase, valve controlled means for delivering air from said crankcase to said combustion chamber, a fuel source, and injector means, connected near said other end of said cylinder for delivering fuel at predetermined intervals to said combustion chamber.

19. The engine of claim 1 including a crankcase housing said crankshaft and means providing a passageway between said crankcase and said cylinder inlet port, injector means connected near the other end of said cylinder for delivering fuel at predetermined intervals to said combustion chamber, and valve means dominating said passageway.

20. The engine of claim 1 including a crankcase housing said crankshaft and means providing a passageway between said crankcase and said cylinder inlet port, injector means connected near the other end of said cylinder for delivering fuel at predetermined intervals to said combustion chamber, and a reed valve dominating flow between said crankcase and said passageway and opening toward said passageway.

21. The engine of claim 1 including a crankcase housing said crankshaft and means providing a passageway between said crankcase and said cylinder inlet port, means for producing a combustible mixture of fuel and air, conduit means connecting said mixture-producing means to deliver such mixture to said crankcase, and valve means dominating said passageway, said passageway being closed relative to the interior of said crankcase whenever the fluid pressure within said passageway exceeds the fluid pressure within said crankcase.

References Cited

UNITED STATES PATENTS

| | | |
|---|---|---|
| 386,211 | 7/1888 | Nash. |
| 898,317 | 9/1908 | Carpenter _____ 123—21 |
| 1,008,199 | 11/1911 | Riegels. |
| 1,172,472 | 2/1916 | McCornack. |
| 1,572,709 | 2/1926 | Fahrney. |
| 1,598,891 | 9/1926 | Stokes _____ 123—21 |
| 2,791,078 | 5/1957 | Kiekhaefer. |
| 3,195,526 | 7/1965 | Jordan. |

FOREIGN PATENTS

| | | |
|---|---|---|
| 453,536 | 12/1927 | Germany. |
| 95,602 | 5/1939 | Sweden. |

WENDELL E. BURNS, Primary Examiner

U.S. Cl. X.R.

123—73

PO-1050
(5/69)

UNITED STATES PATENT OFFICE
CERTIFICATE OF CORRECTION

Patent No. __3,499,425__  Dated __March 10, 1970__

Inventor(s) __Dewey E. Gommel__

It is certified that error appears in the above-identified patent and that said Letters Patent are hereby corrected as shown below:

Column 2, line 61, "combustible" is misspelled; same column, line 64, "expedient" is misspelled; same column, line 66, "casing" should be -- casting --.

Column 3, line 12, "revolution" is misspelled; same column, line 18, "illustrating" should be -- illustrated --; same column, line 33, "52" should be -- 42 --; same column, line 43, delete "be".

Column 4, line 41, "value" should be -- valve --.

Column 5, line 3, "1" should be -- I --; same column, line 4, "upper" is misspelled; same column, line 7, "line" should be -- liner --; same column, line 31, "suitable" should be -- suitably --; same column, line 67, "148" should be -- 248 -- and "with" is misspelled.

Column 8, line 52, "means" is misspelled.

Column 9, line 9 (Claim 1, line 6), "other" should be -- open --; same column, line 37 (Claim 5, line 1), "portion" should be -- port --.

Signed and sealed this 4th day of August 1970.

(SEAL)
Attest:

EDWARD M. FLETCHER, JR.
Attesting Officer

WILLIAM E. SCHUYLER, JR.
Commissioner of Patents